United States Patent
Lehtinen et al.

(10) Patent No.: US 7,248,873 B2
(45) Date of Patent: Jul. 24, 2007

(54) PARAMETER SELECTION OPTIMIZATION FOR HANDOVER

(75) Inventors: Otto-Alekasanteri Lehtinen, Raisio (FI); Jussi Pekka Äijänen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 272 days.

(21) Appl. No.: 10/668,299

(22) Filed: Sep. 24, 2003

(65) Prior Publication Data
US 2004/0266434 A1 Dec. 30, 2004

(30) Foreign Application Priority Data
Jun. 25, 2003 (EP) ................... 03014322

(51) Int. Cl.
*H04Q 7/20* (2006.01)
(52) U.S. Cl. ................ 455/436; 455/440; 455/444; 455/445
(58) Field of Classification Search ............. 455/436, 455/442, 443, 445
See application file for complete search history.

(56) References Cited
U.S. PATENT DOCUMENTS

| | | | |
|---|---|---|---|
| 5,995,836 A * | 11/1999 | Wijk et al. ............ 455/436 |
| 6,373,834 B1 * | 4/2002 | Lundh et al. .......... 370/350 |
| 6,570,862 B2 * | 5/2003 | Virtanen .............. 370/335 |
| 6,735,436 B1 * | 5/2004 | McCauley et al. ..... 455/424 |
| 6,757,520 B2 * | 6/2004 | Attar et al. ........... 455/63.1 |
| 6,807,421 B1 * | 10/2004 | Ahmavaara ........... 455/438 |
| 6,993,332 B2 * | 1/2006 | Pedersen et al. ...... 455/436 |
| 2002/0018010 A1 * | 2/2002 | Le ..................... 341/60 |
| 2002/0082012 A1 * | 6/2002 | Wang et al. .......... 455/435 |
| 2003/0157934 A1 * | 8/2003 | Liang ................. 455/436 |
| 2003/0174733 A1 * | 9/2003 | Kawai et al. ......... 370/498 |
| 2003/0224826 A1 * | 12/2003 | Sakata et al. ........ 455/560 |
| 2004/0202119 A1 * | 10/2004 | Edge .................. 370/324 |
| 2004/0219919 A1 * | 11/2004 | Whinnett et al. ..... 455/442 |

\* cited by examiner

*Primary Examiner*—Lester G. Kincaid
*Assistant Examiner*—Fred Casca
(74) *Attorney, Agent, or Firm*—Squire, Sanders & Dempsey L.L.P.

(57) ABSTRACT

Methods and devices for selecting a handover parameter in a cellular network, wherein a delay of a handover procedure is typically measured and the handover parameter is generally set based on the result of the measuring step. Thereby, the system capacity may be maximized dynamically, depending on the system load and the physical configuration. An optimization of parameter and capacity thus becomes possible.

21 Claims, 3 Drawing Sheets

PARAMETER SELECTION OPTIMIZATION FOR HANDOVER

BACKGROUND OF THE INVENTION

1. Field of the Invention

The present application relates generally to methods and devices for selecting handover parameters in cellular networks, such as, but not limited to, a Universal Mobile Telecommunications System Radio Access Network (UTRAN).

2. Description of the Related Art

In cellular networks, handover is often a functionality that switches the user equipment (UE) from one cell to another for any of various reasons. One of the main reasons for handover is usually when another cell can provide a service with less power, in other words, less link budget. There are several parameters that generally control the handover decision making in a noisy multi-path channel. These parameters may be optimized, depending on various conditions, typically to maximize the network capacity and/or to enable auto configuration in the UTRAN. Usually, in the time division duplex (TDD) mode of the UTRAN, a Wideband Code Division Multiple Access (WCDMA) handover procedure is performed as described, for example, in the Third Generation Partnership Project (3GPP) specification TR 25.922, v.0.5.0, "Radio Resource Management Strategies".

In many situations, the handover procedure includes of a set of parameters to be set. These parameters usually include, among others, a hysteresis value, typically in the active set update, and the length of an averaging window, usually for power measurements. These parameters often play an important role in adjusting the sensibility of handover, especially in the presence of fast channel variations and/or measurement errors. The added hysteresis normally prevents unnecessary and/or frequent handovers, also known as ping-ponging, that often disturbs quality of the connection, reduces the overall system capacity, and/or introduces unnecessary signaling load. Furthermore, measured received signal code power (RSCP) values generally are averaged over some time periods, usually in order to prevent handover that is typically due to short-term variations in the signal.

In many real networks, some delay is generally also involved in the handover execution. When, for example, a terminal device and/or user equipment (UE) according to the UTRAN terminology, triggers a handover report, which commonly means that the RSCP value of a candidate cell exceeds the RSCP value of the active cell by the hysteresis value, it typically takes some time before the handover report is delivered to the network device responsible for the handover operation, for example, a radio network controller (RNC). Furthermore, some delay is normally involved in the processing of a handover message, setting-up of a connection between the RNC and a serving base station, and/or Node B according to the UTRAN terminology, and/or allocation of radio resources for the UE in the new Node B. Further details concerning these measurements and related accuracy requirements can be gathered, for example, from the 3GPP specifications TS25.123, "Requirements for Support of Radio Resource Management (TDD)", and TS25.225, "Physical Layer Measurements".

Usually, the handover decision making is based on a comparison between an observed value and a predetermined threshold value, wherein the threshold value is typically chosen in a manner so as to maximize the system capacity under various conditions. However, the above handover delay commonly causes interference and switching back and forth generally causes additional interference, usually due to a prolonged connection to the old cell. Moreover, if the channel conditions are not favorable to sustain the connection in the new cell, correction of the improper handover decision is usually delayed and/or additional interference is often generated.

SUMMARY OF THE INVENTION

It is therefore an object of certain embodiments of the present invention to provide an optimized parameter setting and capacity.

This object may be achieved, for example, by a method of selecting a handover parameter in a cellular network. This method may include the steps of measuring a delay of a handover procedure, and setting the handover parameter based on the result of the measuring step.

Furthermore, the above object may be achieved, for example, by a network device for selecting a handover parameter in a cellular network. The device typically including measuring means for measuring a delay of a handover procedure, and setting means for setting the handover parameter in response to the measuring means.

Accordingly, by setting and/or selecting the handover parameter based on a measured handover delay, system capacity may be maximized dynamically, depending on the system load and/or physical configuration, which both generally determine the actual handover delay. Thereby, parameter and/or capacity optimization becomes possible. Thus, system capacity may be maximized under varying conditions.

The handover parameter may be at least one of the hysteresis value for a handover threshold and/or the length of the averaging window used for measuring transmission quality of the radio connection. The handover parameter may be tuned dynamically based, for example, on the result of the measuring step. Of course, other suitable handover parameters may be selected based on, for example, the measured handover delay.

The handover delay may include at least one of a round trip delay of a physical layer protocol signaling, a delay between a radio network controlling device and a base station device, a measurement delay at a terminal device, and a processing delay of the cellular network. According to certain embodiments, the physical layer protocol may be a radio resource control protocol.

The result of the measuring step may be compared with a predetermined threshold, for example, a threshold of 200 ms in case of the hysteresis value.

The setting step may include setting the handover parameter to a first value when the measured handover delay is smaller than the predetermined threshold, and setting the handover parameter to a second value when the measured handover delay is not smaller than the predetermined threshold.

The measuring step may include measuring an acknowledged mode signaling round trip delay and/or estimating a peer-to-peer signaling delay, commonly based on the measured round trip delay. According to certain embodiments, the measuring step may be based on a counting operation for counting time stamps.

According to other embodiments, the measuring step may include calculating and/or deducing the delay from a standard protocol message by using, for example, a common time reference.

According to yet other embodiments, the measuring step may include measuring an uplink delay based on, for example, an event report propagation time using time stamps, and/or measuring a downlink delay based on a physical channel reconfiguration message.

The measuring means may include a frame counter for keeping a time stamp.

Further embodiments are discussed in the present application.

BRIEF DESCRIPTION OF THE DRAWINGS

Certain embodiments of the present invention will now be described with reference to the accompanying drawings in which.

DETAILED DESCRIPTION OF THE PREFERRED EMBODIMENTS

Figure 1:
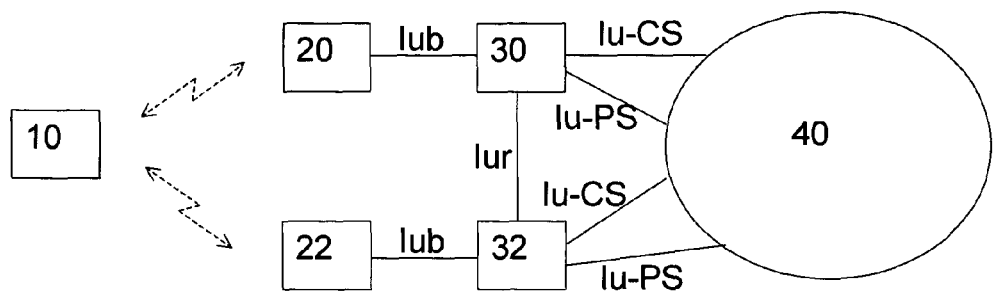
FIG. 1 shows a schematic block diagram of a representative network architecture in which certain embodiments of the present invention may be implemented.

Some embodiments of the present invention will now be described, usually on the basis of a third generation WCDMA radio access network architecture, for example, a UTRAN as shown in FIG. 1.

FIG. 1 shows a common terminal device or UE 10 connected via an air interface to a first Node B 20 and a second Node B 22. It is noted that the Node B is often a base station device, generally in third generation radio access networks. According to certain embodiments of the present invention, it may be assumed that the UE 10 is intended to be handed over from the second Node B 22 to the first Node B 20. The first and second Nodes B 20, 22 are typically connected via respective Iub interfaces to first and second radio network controllers (RNCs) 30, 32 which are generally connected to each other via an Iur interface. The Nodes B 20, 22 are commonly logical nodes that are responsible for radio transmission and/or reception in one or more cells to/from the UE 10 and typically terminate the Iub interface towards the respective RNCs 30, 32. The RNCs 30, 32 are normally in charge of controlling use and/or integrity of radio resources within the radio access network. In particular, the RNCs 30, 32 are often in charge of controlling handover operations, usually from one Node B to another Node B. Furthermore, the RNCs 30, 32 routinely provide connections to a third generation core network 40, for example, a UMTS network, commonly for both circuit-switched traffic via a Iu-CS interface and/or packet-switched traffic via a Iu-PS interface. The existence of an open standardized Iur interface is usually highly preferable for proper network operation, including, for example, handover support in a multi-vendor environment. It should be noted that, in a typical case, many node Bs may be connected to the same RNC.

According to certain embodiments, the UE 10 is normally served by the second RNC 32, usually via the second Node B 22. Hence, the second RNC 32, in many instances, has a serving RNC (SRNC) functionality, which is commonly a role an RNC may take with respect to a specific connection between, for example, a UE and the UTRAN. Often, there is one SRNC for each UE that has a connection to the UTRAN. The SRNC is generally in charge of the Radio Resource Control (RRC) connection between the UE 10 and the UTRAN.

Furthermore, it is generally assumed that the first RNC 30 has a Controlling RNC (CRNC) functionality, which is typically a role an RNC can take with respect to a specific set of UTRAN access points. There is commonly only one CRNC for any UTRAN access point. The CRNC usually has overall control of the logical resources of its UTRAN access point. An UTRAN access point is normally a conceptual point within the UTRAN performing radio transmission and/or reception. An UTRAN access point is generally associated with one specific cell. In other words, there usually exists one UTRAN access point for each cell. Thus, the access point is often the UTRAN-side end point of a radio link. In FIG. 1, the first and second Nodes B 20, 22 are normally UTRAN access points.

Figure 2:
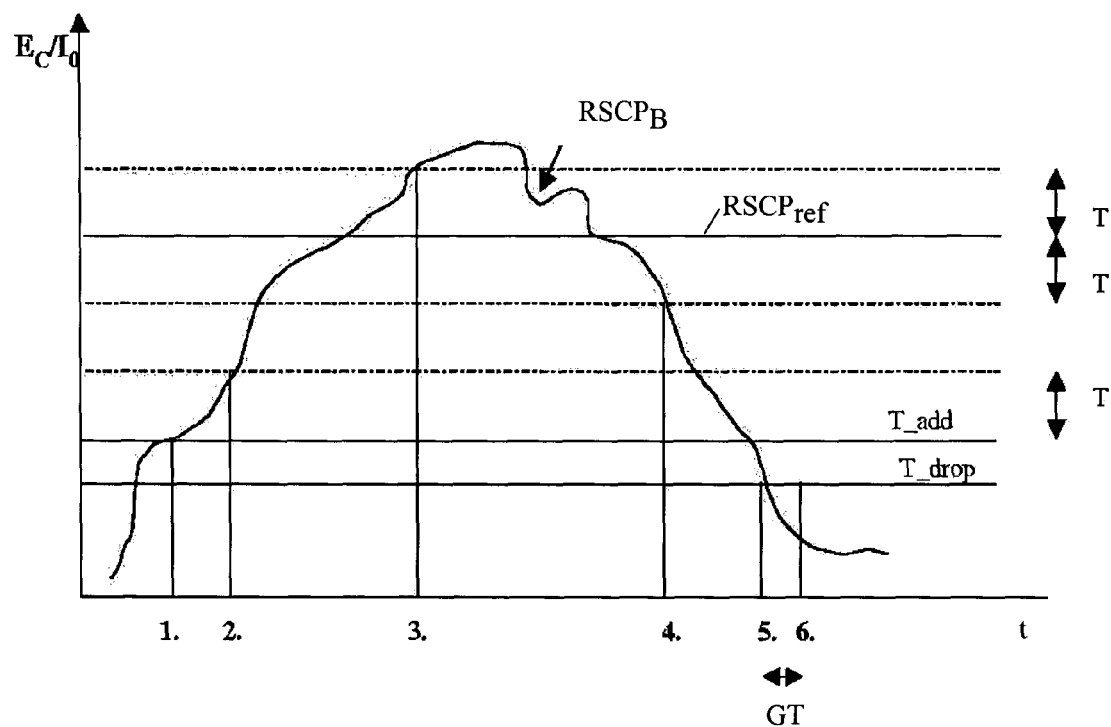
FIG. 2 shows a schematic diagram indicating a representative measured time behavior of the quality of a received signal and an example of a handover procedure.

FIG. 2 shows a schematic diagram of an exemplary time behavior of a measured signal quality at the UE 10. In particular, a measured ratio $E_c/I_0$ is indicated on the vertical axis, which corresponds to the ratio of energy per modulating bit to the total received power spectral density, including signal and interference, as typically measured at the antenna connector of the UE 10.

In FIG. 2, the exemplary handover control normally keeps track of candidate cells whose quality would be generally sufficient for transmission and/or reception, but which are usually not yet selected as active cells. Typically, any cell whose received signal code power of the Primary Common Control Physical Channel (P-CCPCH) exceeds a first predetermined level T_add is added to a candidate set, as shown at point 1 of FIG. 2. Under normal circumstances, if the maximum size of the candidate set is exceeded, a new cell may be added to the candidate set, but usually only if the RSCP level of the new cell exceeds the RSCP level of at least one cell in the candidate set by a certain hysteresis threshold value T, as indicated at point 2 in FIG. 2. Then, according to certain embodiments, the weakest cell is removed from the candidate set and/or the new cell is generally added. If the UE 10 notices, normally from its power measurements, that the RSCP of a candidate set cell exceeds that of the active cell by at least the hysteresis threshold T, a new cell is usually selected to be an active cell, while the current active cell is typically dropped to the candidate set, as indicated in points 3 and 4 of FIG. 2. According to certain embodiments, a reference level $RSCP_{ref}$ indicates the RSCP level of a reference active cell in FIG. 2. As the measured RSCP level of a cell B exceeds the reference level $RSCP_{ref}$ between points 3 and 4 in FIG. 2, the corresponding Node B, which serves cell B, is commonly set to the active state.

As can be gathered from the embodiments shown in FIG. 2, the added hysteresis value T generally prevents unnecessary and/or frequent handovers which often mainly disturb quality of the connection, commonly reduce overall system capacity and/or introduce unnecessary signaling load. Furthermore, the measured RSCP values may be averaged over a period of time to prevent handover due to, for example, short-term variations in the signal.

According to certain embodiments, if the measured RSCP of a cell drops below a second predetermined level T_drop, as indicated at point 5 in FIG. 2, then the UE 10 starts a timer. The corresponding base station is then usually dropped from the candidate set if the RSCP level stays below the second threshold T_drop for a predetermined time, for example, the guard time GT, as indicated at point 6 of FIG. 2.

Consequently, the number of handovers will generally decrease as the hysteresis value T is increased. This is usually predictable, since higher hysteresis typically requires higher RSCP for a new Node B and/or base station to be selected and, in many cases, no handovers are made, usually due to fast and temporary changes in the RSCP level. Thus, the rate of active set updates normally gets slower.

Furthermore, the length of the averaging window also commonly has a clear impact on the number of handovers and, consequently, on the rate of active set updates. For example, the enlargement of the averaging window generally prevents unnecessary handovers, typically due to fast channel variations. When the filtering length of the averaging window is high, some delay is commonly introduced to the handover execution, usually when the UE 10 penetrates to the area of an adjacent cell while communicating with high powers with the other Node B. This commonly leads to high interference to the new Node B, and, thus capacity loss for the system.

According to certain embodiments of the present invention, the handover parameters, such as, but not limited to, the hysteresis value T, the length of the averaging window and/or other suitable parameters, are normally selected based on a measured handover delay to thereby optimize parameter selection.

Figure 3:
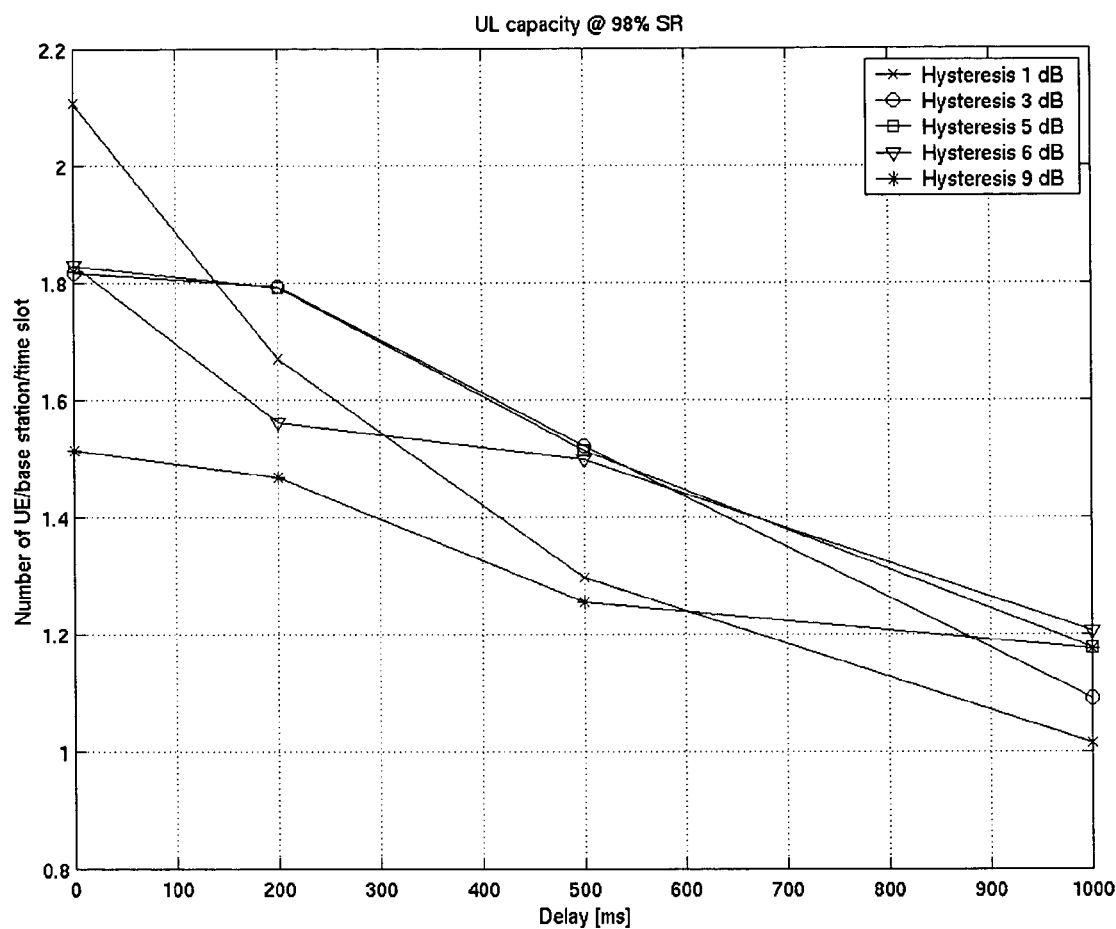
FIG. 3 shows a diagram indicating a typical system capacity as a function of handover delay at various hysteresis values.

FIG. 3 shows a diagram indicating a representative system capacity as a function of handover delay at various hysteresis values. As can be gathered from FIG. 3, a hysteresis value T=1 dB may provide a high system capacity at low delay values while a hysteresis value T=6 dB may provide a high system capacity at higher delay values. The system capacity is indicated in FIG. 3 as the number of UEs per base station per time slot.

Hence, it may be gathered from FIG. 3 that the hysteresis value T may be selected in dependence on the measured handover delay to thereby improve overall system capacity. In particular, the handover delay, which typically includes RRC Round Trip Delay, RNC-to-Node B delay, UE measurement delay and/or UTRAN processing delay, is normally measured. Then, the measured value may be compared to a predetermined threshold value, and an appropriate hysteresis value may be selected based on the comparison result. Furthermore, the hysteresis value T may be tuned dynamically in accordance with the measurement result.

Based on the measured conditions shown in FIG. 3 and/or on parameters believed to represent a typical case, the threshold value or the handover delay may be set, for example, to approximately 200 ms, plus or minus 20 ms. Then, if the delay is lower than 200 ms, a hysteresis value T=1 dB is generally selected for handover. Otherwise, a hysteresis value T=6 dB is normally used. Of course, other suitable delay threshold values and hysteresis values may be selected based on specific requirements of the embodiment.

Figure 4:
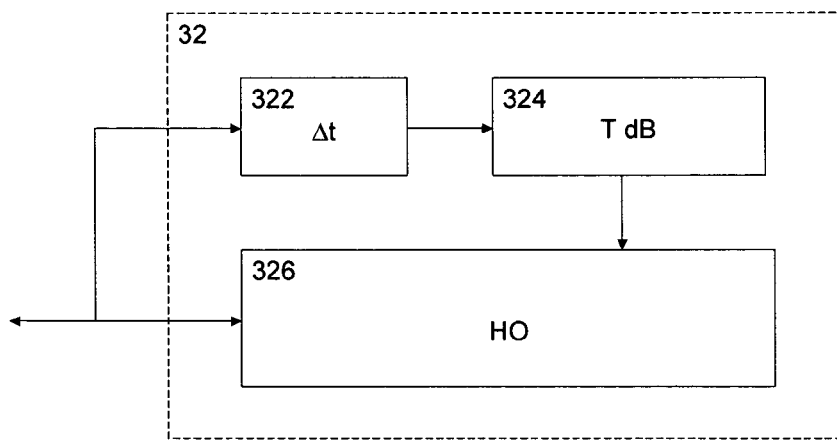
FIG. 4 shows a schematic block diagram of an exemplary handover parameter selection functionality according to certain embodiments of the present invention.

FIG. 4 shows a representative schematic block diagram of a handover control functionality as implemented, for example, at the SRNC 32 in FIG. 1. The handover control functionality typically includes a handover control unit 326 which is commonly adapted to generate a corresponding handover control signaling to be supplied to the respective UEs, usually via respective Node B devices. Based on these handover control signalings, a delay measuring unit 322 normally detects and/or measures and/or calculates the handover delay and/or supplies the result to a hysteresis selection unit 324 which generally selects a suitable hysteresis value T and typically supplies it to the handover control unit 326. The units 322, 324 and 326 may be implemented, for example, as concrete hardware units and/or as subroutines controlling a processing unit at the SRNC 32.

The handover delay, for example, the signaling and/or decision making delay for the handover operation, as indicated in FIG. 3, may be measured at the measuring unit 322 based on different approaches, including at least those defined in the following embodiments.

According to certain embodiments, the handover delay may be measured using, for example, an RRC acknowledged mode (AM) signaling from the SRNC 32 to the UE 10. According to certain embodiments, the delay measuring unit 322 of the SRNC 32 is typically adapted to measure the AM round trip delay and/or to estimate the peer-to-peer signaling delay based on this. The accuracy of one frame, for example, +/−10 ms, would not generally have significant impact compared to the typical time duration for the delay threshold of the RRC signaling, for example, approximately 200 ms. The measurement may be based on a time stamp, normally provided by a frame counter function which may be implemented in, for example, the delay measuring unit 322. In this respect, it may be generally assumed that keeping the time stamp of the signal alongside the acknowledgement does not typically lead to a significant error, usually due to the fact that the system prefers to have other counters as well to help assure proper system operation.

According to another embodiment, a common time reference may be used, typically at the delay measurement unit 322. The common time reference may be provided, for example, in order to provide location services and/or other standard RRC messages wherein the signaling and/or handover delay is then typically calculated and/or deduced from these messages.

According to yet another embodiment, time stamps, commonly provided on the signaling received from the UE 10, may be used to measure, for example, the event 1G report propagation time from the UE 10 to the SRNC 32, and/or another corresponding handover decision making entity, generally so as to obtain the uplink delay. Then, the downlink delay may be determined directly from the Physical Channel Reconfiguration message as defined, for example, in the 3GPP specification TS 25.331, Section 10.2.22, for example, based on the activation time information element. The overall handover delay is then commonly obtained at a delay measuring unit 322, usually as the sum of the uplink delay and the downlink delay.

Figure 5:
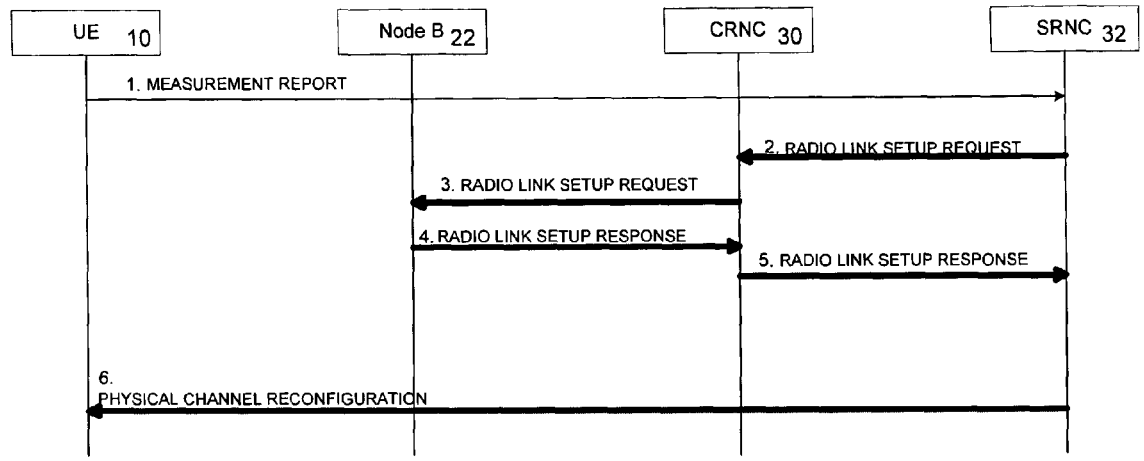
FIG. 5 shows a schematic signaling diagram of a common protocol signaling of a handover operation.

FIG. 5 shows a representative schematic signaling diagram indicating a handover protocol signaling based on which the handover delay may be obtained. In step 1, a measurement report, which typically contains the measured RSCP value and/or any other value indicating the received power is commonly forwarded from the UE 10 to the SRNC 32. If the handover control unit 326 at the SRNC 32 decides to initiate a handover operation, a Radio Link Setup Request is generally issued and forwarded in steps 2 and 3, usually via the CRNC 30 to the Node B 22 serving the UE 10. In response thereto, the Node B 22 normally forwards a Radio Link Setup Response in step 4 to the CRNC 30 which typically forwards the Radio Link Setup Response to the SRNC 32 in step 5. Then, in step 6, the Physical Channel Reconfiguration message is commonly forwarded to the UE 10, usually to initiate a channel reconfiguration.

As already mentioned above, the measurement report normally forwarded in step 1 and the physical channel reconfiguration message typically forwarded in step 6 may be used in certain embodiments to measure the uplink delay and/or the downlink delay, respectively.

Of course, other round trip measurement methods may be used for obtaining the handover delay at the delay measuring unit 322.

Figure 6:
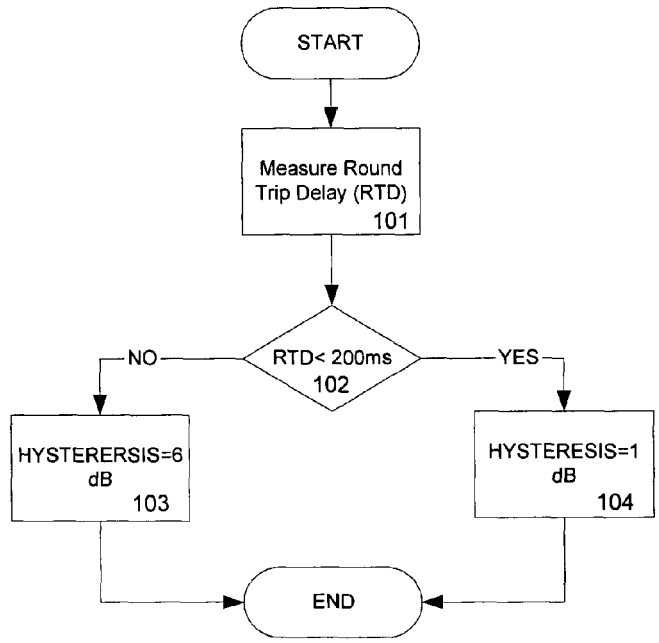
FIG. 6 shows a schematic flow diagram of a representative hysteresis selection procedure according to certain embodiments of the present invention.

FIG. 6 shows a representative schematic flow diagram of the hysteresis selection and/or setting operation according to some of the above embodiments. In step 101, the round trip delay is commonly measured based on one of the above approaches. Then, in step 102, the measurement result is normally compared with the predetermined delay threshold, for example, approximately 200 ms. If the measured round trip delay is smaller than the predetermined threshold, a hysteresis value T=1 dB is typically set in step 104, and the routine generally ends. On the other hand, if it is determined in step 102 that the measured round trip delay is not smaller than the predetermined threshold value, a hysteresis value T=6 dB is usually set in step 103 and the procedure normally ends. Thereby, a suitable adaptation of the hysteresis value T to the system capacity may be obtained.

As an alternative, the flow diagram of FIG. 6 may return to the measuring step 101 after each of the hysteresis setting steps 103 and 104. Thereby, a continuous adjustment of the hysteresis value may be obtained.

According to certain embodiments, the length of the averaging window used for determining the RSCP of the P-CCPCH may be selected based on the measured handover delay, for example, round trip delay. As the length of the averaging window usually has an impact on the number of handovers and/or on the delay to handover execution, a similar relationship as indicated in FIG. 3 may be obtained for different lengths of the averaging window. Hence, an optimization of the system capacity and/or of the handover parameters may be obtained by selecting a suitable length of the averaging window in response to a measured delay value.

Finally, it is to be noted that any other suitable handover parameter may be selected and/or set based on the measured handover delay. Furthermore, the parameter selection functionality indicated in FIG. 4 may be implemented in any other entity responsible for performing and/or controlling handover in the respective cellular network. Also, the delay measurement is not restricted to the above approaches. Any other available round trip measurement methods may be employed, as may other measurement methods suitable for determining a decisive handover delay. The embodiments may thus vary within the scope of the attached claims.

We claim:

1. A method of selecting a handover parameter in a cellular network, said method comprising the steps of:
    selecting the handover parameter from a plurality of handover parameters;
    measuring a delay of a handover procedure; and
    setting said selected handover parameter based on the result of said measured delay;
    wherein said measuring step comprises measuring said delay of said handover procedure and wherein said handover delay comprises at least one of a round trip delay of a physical layer protocol signaling, a delay between a radio network controlling device and a base station device, a measurement delay at a terminal device, and a processing delay of said cellular network; and
    wherein said measuring step comprises measuring said handover delay comprising said physical layer protocol and wherein said physical layer protocol comprises a radio resource control protocol.

2. The method according to claim 1, wherein said measuring step comprises measuring said delay of said handover procedure and wherein said handover parameter comprises a hysteresis value for a handover threshold.

3. The method according to claim 1, wherein said measuring step comprises measuring said delay of said handover procedure and wherein said handover parameter comprises a length of an averaging window used for measuring transmission quality of a radio connection.

4. The method according to claim 1, wherein said setting step comprises setting said handover parameter and wherein said handover parameter is tuned dynamically based on the result of said measuring step.

5. The method according to claim 1, further comprising the step of comparing the result of said measuring step with a predetermined threshold.

6. The method according to claim 5, wherein said comparing step comprises said predetermined threshold corresponding to a hysteresis value of at least approximately 200 ms.

7. The method according to claim 5, wherein said setting step further comprises the steps of setting said handover parameter to a first value when said measured handover delay is smaller than said predetermined threshold, and setting said handover parameter to a second value when said measured handover delay is not smaller than said predetermined threshold.

8. The method according claim 1, wherein said measuring step comprises measuring an acknowledged mode round trip delay and estimating a peer-to-peer signaling delay based on the measured round trip delay.

9. The method according to claim 8, wherein said measuring step is based on a counting operation for counting time stamps.

10. The method according to claim 1, wherein said measuring step comprises calculating or deducing said delay from a standard protocol message by using a common time reference.

11. A method of selecting a handover parameter in a cellular network, said method comprising the steps of:
    selecting the handover parameter from a plurality of handover parameters;
    measuring a delay of a handover procedure; and
    setting said selected handover parameter based on the result of said measured delay;
    wherein said measuring step comprises measuring an uplink delay based on an event report propagation time using time stamps, and measuring a downlink delay based on a physical channel reconfiguration message.

12. A network device for selecting a handover parameter in a cellular network, said device comprising:
    selecting means for selecting the handover parameter from a plurality of handover parameters;
    measuring means for measuring a delay of a handover procedure; and
    setting means for setting said selected handover parameter in response to said measured delay;
    wherein said handover delay comprises at least one of a round trip delay of a physical layer protocol signaling, a delay between a radio network controlling device and a base station device, a measuring delay at a terminal device, and a processing delay of said cellular network; and wherein said physical layer protocol is a radio resource control protocol.

13. The device according to claim 12, wherein said handover parameter is a hysteresis value for a handover threshold.

14. The device according to claim 12, wherein said handover parameter is a length of an averaging window used for measuring transmission quality of a radio connection.

15. The device according to claim 12, wherein said measuring means is arranged to derive said delay from an acknowledged mode signaling from a radio network controller to a terminal device to be handed over.

16. The device according to claim 15, wherein said measuring means comprises a frame counter for keeping a time stamp.

17. The device according to claim 12, wherein said measuring means is arranged to calculate or deduce said delay from a standard protocol message.

18. The device according to claim 17, wherein said measuring means is arranged to use a common time reference for calculating or deducing said handover delay.

19. The device according to claim 12, wherein said network device is a device responsible for handover in said cellular network.

20. The device according to claim 19, wherein said network device is a radio network controller.

21. A network device for selecting a handover parameter in a cellular network, said device comprising:

selecting means for selecting the handover parameter from a plurality of handover parameters;

measuring means for measuring a delay of a handover procedure; and setting means for setting said selected handover parameter in response to said measured delay;

wherein said measuring means is arranged to measure an uplink delay based on an event report propagation time, and to measure a downlink delay based on a physical channel reconfiguration message.

* * * * *